UNITED STATES PATENT OFFICE.

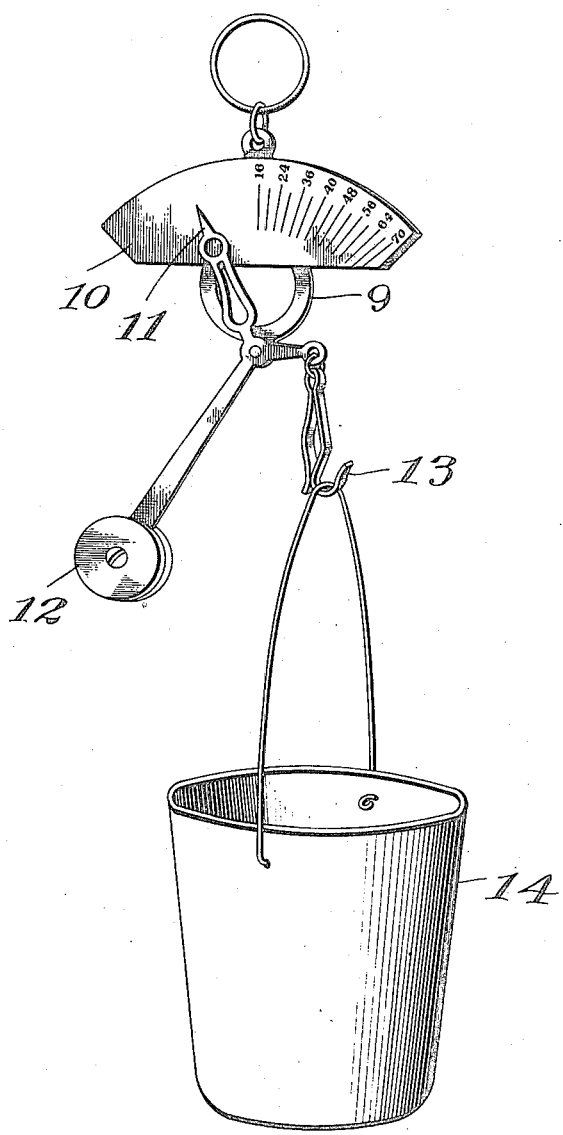

CONRAD R. BENNETT, OF WORCESTER, MASSACHUSETTS.

GRAIN-SAMPLING DEVICE.

1,222,919. Specification of Letters Patent. Patented Apr. 17, 1917.

Application filed September 25, 1913. Serial No. 791,730.

*To all whom it may concern:*

Be it known that I, CONRAD R. BENNETT, a citizen of the United States, residing at Worcester, in the county of Worcester and State of Massachusetts, have invented a new and useful Grain-Sampling Device, of which the following is a specification.

This device relates to a device for sampling grain for the purpose of showing its quality by taking a small sample.

Reference is to be had to the accompanying drawing in which the figure is a front view of a sampling device constructed in accordance with this invention.

One of the most important qualities of grain is represented by the relation between the weight and volume thereof. Grain weighing a large number of pounds per bushel is known to be of better quality than a lighter grain. It is customary to feed horses so many quarts of grain per day but it is obviously a serious matter whether grain weighs fifty-six pounds per bushel or only half that much.

In selling grain the number of pounds per bushel is usually specified but the purchaser heretofore has had no convenient way of verifying the statement of the seller, because the grain is usually offered for sale in loaded freight cars on the track and it is not convenient either to take a bushel away from the car or to weigh it if that could be done.

The particular object of this invention is to provide a simple and small device that can be carried around in the pocket which will accurately and instantaneously determine the number of pounds per bushel by the use simply of a small sample of the grain.

Referring to the drawing, the instrument is shown as comprising a frame 9 having a scale bar 10 provided with graduations to indicate relation between weight and volume, and specifically pounds per bushel, and also having a pointer 11, counterweight 12, and hook 13. On this hook is hung a scale pan 14 which holds a given volume of grain. This scale pan can be furnished to hold a known quantity, as for example, a half pint, or it can be arranged to hold any desired proportion of a bushel, the scale being divided in proportion to the volume held by the scale pan. It is not necessary for the operator of the scale to know how much the scale pan does hold.

The operation of the device is simply to fill the scale pan level full with grain and observe the position of the pointer on the scale pan. This will show at once the number of pounds per bushel.

For example the scale pan may contain half a pint dry measure, that is, one one hundred twenty-eights of a bushel. In that case the scale is divided by graduations to show one hundred and twenty-eight times, in pounds, the actual weight in the scale pan.

In this way a buyer receiving a delivery of grain is provided with effective means for testing it before accepting to see if it is of the same weight as the sample from which it was purchased or the same as contracted for. In this way little time is required and the device is so convenient that several tests can be made from different parts of the car in a minimum of time.

Although I have illustrated and described a specific embodiment of the invention, and shown it as applied only to the weighing of grain, I am aware of the fact that the same principle can be carried out with other forms of apparatus and for the purpose of sampling other articles than grain without departing from the scope of the invention as expressed in the claim, therefore, I do not wish to be limited in these respects, but what I do claim is:—

In a device of the character described, the combination of a main supporting frame having a fixed scale bar thereon, provided with graduations indicating pounds per bushel, a weighted pointer pivoted on said frame and movable over said scale bar, and a scale pan connected with said pointer and having a capacity for receiving a definite volume of grain, whereby upon the filling of said scale pan with grain, the pointer will show on the scale the number of pounds to each bushel of such grain.

In testimony whereof I have hereunto set my hand, in the presence of two subscribing witnesses.

CONRAD R. BENNETT.

Witnesses:
  ALBERT E. FAY,
  C. FORREST WESSON.